Feb. 27, 1945. D. G. C. HARE 2,370,163
METHOD AND APPARATUS FOR EXAMINING OPAQUE MATERIAL
Filed Oct. 16, 1941 2 Sheets-Sheet 1
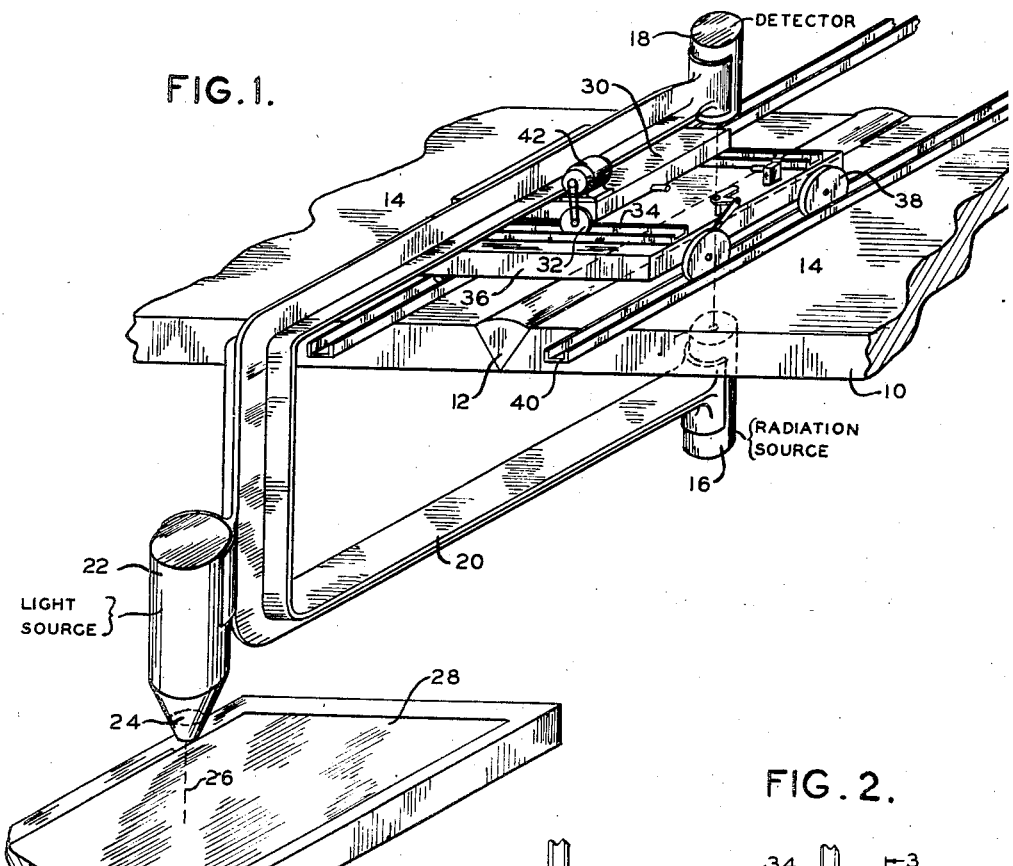
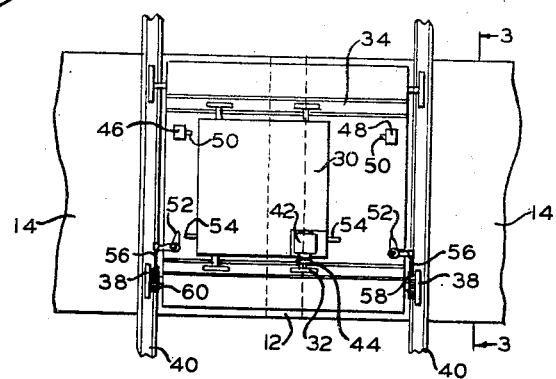
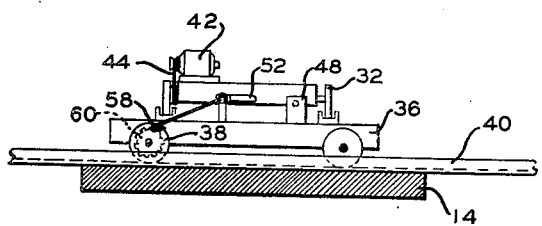
D.G.C. HARE
INVENTOR
BY
HIS ATTORNEYS Feb. 27, 1945.   D. G. C. HARE   2,370,163
METHOD AND APPARATUS FOR EXAMINING OPAQUE MATERIAL
Filed Oct. 16, 1941   2 Sheets-Sheet 2

D.G.C. HARE
INVENTOR
BY R. J. Dearborn
   Daniel Stryker
HIS   ATTORNEYS

Patented Feb. 27, 1945

2,370,163

UNITED STATES PATENT OFFICE 2,370,163

METHOD AND APPARATUS FOR EXAMINING OPAQUE MATERIAL

Donald G. C. Hare, Houston, Tex., assignor, by mesne assignments, to The Texas Company, New York, N. Y., a corporation of Delaware Application October 16, 1941, Serial No. 415,198

12 Claims. (Cl. 250—83.6)

This invention relates to the examining or testing of opaque objects such as metal plates, castings and the like and more particularly to a method and an apparatus for examining welds in steel plates for irregularities or flaws therein. The principal object is to provide a method and an apparatus by means of which, in a comparatively short time, a record or a picture may be obtained of the interior of an opaque object such as the joint between steel plates which have been welded together. Another object is to provide such a method and an apparatus by means of which metal plates or castings can be examined for irregularities or flaws due to air holes or the like in an exceedingly short time compared to that required heretofore.

Various methods have been proposed and used with varying degrees of success for examining opaque objects by means of X-rays, but such methods are generally limited in their use to the testing of objects not more than one inch in thickness if of metal, and, when examining objects, having thicknesses no greater than this, expensive and cumbersome apparatus is required.

Methods have also been used for detecting irregularities in plates of steel or other metals wherein penetrative radiation from a source such as radium is directed through the object from one side to a sensitized plate or film at the other side. In accordance with this method the radiation penetrates the material of which the object is formed and the transmitted radiation forms an image on the sensitized plate which may indicate flaws in the object. This has many disadvantages, however, among the more important of which are the facts that a large amount of radium is required in examining an object, such for example, as a steel plate of more than an inch or so in thickness and a long time is required in order to produce a useful image. This is due to the fact that the thin and light emulsion on the film will absorb only a very small percentage of the necessarily highly penetrating radiation passing through it which results in an unreasonably long exposure time even where a large source is used, to obtain a negative of adequate density. In examining steel plates of six inches or more in thickness, several days are often required before a satisfactory picture is obtained. Obviously such time requirements render this method almost valueless in production work.

In accordance with the invention, a method has been provided whereby an indication may be had or a picture obtained of the interior of an opaque object or any desired section thereof in a matter of minutes rather than hours or days. Penetrative radiation such as gamma rays from a source such as radium or neutrons from a source such as a mixture of radium and beryllium is passed through the object to be examined from one side thereof, and variations in the amount of radiation transmitted through the object to the other side are detected as the source and detecting means are moved about over that portion of the object to be examined. In one of its simplest embodiments the invention may comprise a U-shaped member or yoke having a radiation source mounted at one end and a radiation detector at the other so that the yoke can straddle the plate or other object to be examined. The detector would be connected to a suitable indicating meter or to a recording instrument so that variations in the amount of radiation transmitted from the source to the detector through the object to be examined could be noted or measured. The yoke would be moved about over the surface of the object and in case an irregularity or flaw, such as might be caused by the presence of a blow hole in the plate, would cause a variation in the amount of transmitted radiation detected and the location of the flaw could thus be ascertained.

In another embodiment of the invention the source and detector can be mounted independently at opposite sides of the object to be examined so that by means of mechanical or electrical apparatus, they can be moved in synchronism back and forth longitudinally and laterally so as to "scan" the desired portion of the object to be examined. The output of the detector would be connected to a device such as a source of light mounted to be moved over a light-sensitive plate or film in synchronism with the movement of the source and detector. The light output would be a desired function of the intensity registered by the detector or a suitable time average of the detector output and the light will thus produce on the film a variable density record, the more densely blackened areas corresponding to less dense material traversed by the radiation or vice versa. By moving the source, detector and lamp in parallel lines close together, one will thus obtain a record on the film giving a continuous and detailed picture of the density or thickness of the object being examined, this "scanning" being analogous to the scanning of an image by a television receptor or perhaps, more appropriately, to the half-tone facsimile reproduction used to transmit pictures or other information from a source to a remotely located receptor. In accordance with this embodiment there need be no rigid mechanical connection between the source and the detector or between either of these elements and the recording device since an electrical system employing, for example, a series of "Selsyn" motors could be utilized to provide the desired synchronism. In this manner an object such as a desired section of a large plate, for instance, the wall of a ship, could be examined and a picture obtained of the interior of that section or of a weld between two sections of the ship's plating.

In certain cases, particularly when examining castings which may be large in areal extent or whose geometry is unfavorable, it may be found inconvenient to move both the source and the detector without altering their position relative to one and the other. In this case the examination can be carried out in a manner such as to yield essentially the same information as in the previous case by fixing the position of either the source or the detector and moving the other element with respect to both the fixed element and the subject under examination and providing for a suitable correction of the light intensity to correct for the changed geometry as well as for any normal force of the configuration of the object being examined.

For a better understanding of the invention reference may be had to the accompanying drawings in which Fig. 1 is a perspective view showing an apparatus for making a picture image of the interior of a weld in a butt joint between two metal plates;

Fig. 2 is a top plan view of the apparatus shown in Fig. 1 with the source, detector and lamp and their supporting arm removed;

Fig. 3 is a vertical sectional elevation taken on the line 4—4 of Fig. 2;

Fig. 4 is a somewhat diagrammatic vertical sectional elevation of another embodiment of the invention, while

Figure 5:
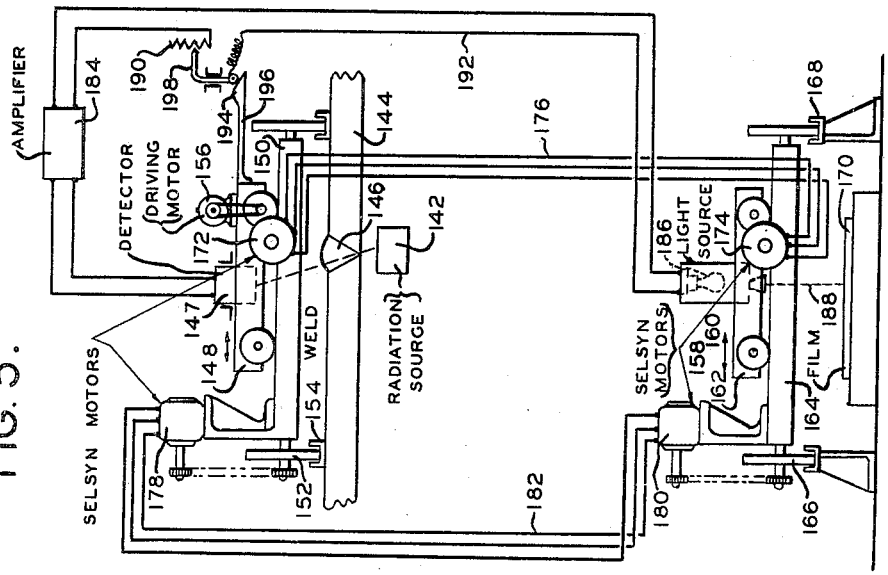
Fig. 5 is a somewhat diagrammatic vertical elevation of still another embodiment in which the radiation source is shown as being fixed in position while the detector and light source are adapted to be moved in synchronism.

Referring to the drawings and particularly to Figs. 1 through 4 thereof, an object 10 to be examined is shown as a butt joint containing a weld 12 between two plates 14 of steel or other metal. A source of penetrative radiation indicated generally at 16 and a suitable radiation detector 18 are shown as being supported in fixed relation to each other at opposite sides of the object 10 by means of a U-shaped member or a yoke 20. Also mounted on the yoke 20 is a light source 22 containing a suitable electric lamp and a lens system 24 for projecting a pencil of light 26 onto a light-sensitive film or plate 28. It is understood that the device 18 may be any suitable detector of radiation such as a Geiger-Muller counter or an ionization chamber, but it is preferred to use a high efficiency detector of the type described in my co-pending application, Serial Number 364,020, filed November 2, 1940. The detector disclosed in this co-pending application has proven to be many times more efficient as well as more rugged and stable in operation than the conventional Geiger-Muller counter.

The support 20 is connected to a carriage 30 having wheels 32 adapted to travel on rails or in grooves 34 in another carriage 36. The carriage 36 is provided with wheels 38 adapted to travel in rails 40 which may rest upon or be clamped to the upper surface of the plates 14 at opposite sides of the weld 12. The carriage 30 will permit motion of the support 20 laterally of the weld 12 while the carriage 36 will permit longitudinal motion with respect to the weld. A reversible electric motor 42 is mounted on the carriage 30 and is adapted to move the carriage 30 back and forth across the weld 12 by means of a gearing or belt connection 44 with one of the wheels 32. A pair of reversing switches 46 and 48 are mounted at opposite sides of the carriage 36 and are provided with tripping members 50 adapted to be engaged by the sides of the carriage 30 when the latter has reached either end of its travel. The reversing switches 46 and 48 are connected electrically with a source of electrical supply and the motor 42 so that, for instance, when the carriage travels to the right in viewing Fig. 2 it will engage the tripping device 50 of the switch 48 to reverse the motor 42 and cause it to travel toward the left. The carriage 30 will then strike the reversing switch 46 to reverse the motor 42 causing it again to travel toward the right. Means are also provided for moving the source and the detector longitudinally with respect to the weld 12, this means comprising a pair of bell crank levers 52 pivotally mounted on the carriage 36, one of the arms of each lever being adapted to be engaged by a projection 54 on each side of the carriage 30. The other arm of each lever 52 is connected to a rod 56 having at its end a pawl 58 adapted to engage a ratchet wheel 60 attached to one of the wheels 38.

It is believed that the operation of the scanning apparatus will be clear from the foregoing description. The carriage 30 will move across the weld 12 until it strikes one of the tripping devices 50 which will cause the motor 42 to reverse and move the carriage 30 across the weld in the opposite direction. Each time the carriage 30 completes its travel in one direction one of the projections 54 will engage one of the levers 52 which will swing angularly to push one of the rods 56 ahead to advance one of the ratchet wheels 60 a slight amount. The carriage 36, therefore, will move longitudinally with respect to the weld 12 a very slight amount each time the carriage 30 completes its lateral travel in one direction.

Since the support 20 is rigidly secured to the carriage 30 the source 16, detector 18 and light source 22 will move in synchronism. As the device is moved back and forth laterally and advanced longitudinally with respect to the weld 12, the detector 18 will pick up a varying amount of radiation transmitted from the source 16 through the plates 14 and the weld 12 and the output of the detector will be a function of the density and amount of material between the detector and the source 16. The detector 18 is connected electrically with the light source 22 and the intensity of the light beam 26 will be a function of the intensity registered by the detector. Since the light intensity varies according to the output of the detector, it will produce on the film 28 a variable density record or picture in which the darker areas will correspond to areas traversed by the beam of radiation from the source 16 in which there is a lesser amount of material or in which the material is less dense or vice versa. In case there is a flaw or an irregularity in the welded joint, which might be caused, for instance, by a blow hole, there will be a lesser amount of dense material at that point and when the film record 28 has been completed it will contain a dark spot or area corresponding to the location of the blow hole in the weld. It will be seen that in this manner a record or picture can be obtained which will contain an image of the interior of the section of the object being examined and the time required for the preparation of such a picture will be merely that required for the apparatus to scan the desired area in addition to the time required for developing the film 28.

It is believed obvious that by replacing the light source 22 with a suitable indicating meter connected to the detector 18 and by doing away with the carriages 30 and 36 and their associated equipment, the support 20 could be moved manually so that the beam of radiation between the source 16 and the detector 18 would traverse a desired area of an object such as the weld 12 and by observing the response of the meter, one could ascertain the existence of an irregularity in that section or portion of the object. Likewise, the apparatus, as shown in Figs. 1, 2, and 3, could be utilized as has been described but with any other suitable marking device in place of the light source 22. For instance, the light source could be replaced by a magnetically operated pencil or pen travelling across a record sheet 28 in synchronism with the movement of the source 16 and detector 18, the pressure applied by the pen to the sheet 28 being varied, say, magnetically in accordance with the output of the detector 18.

Figure 4:
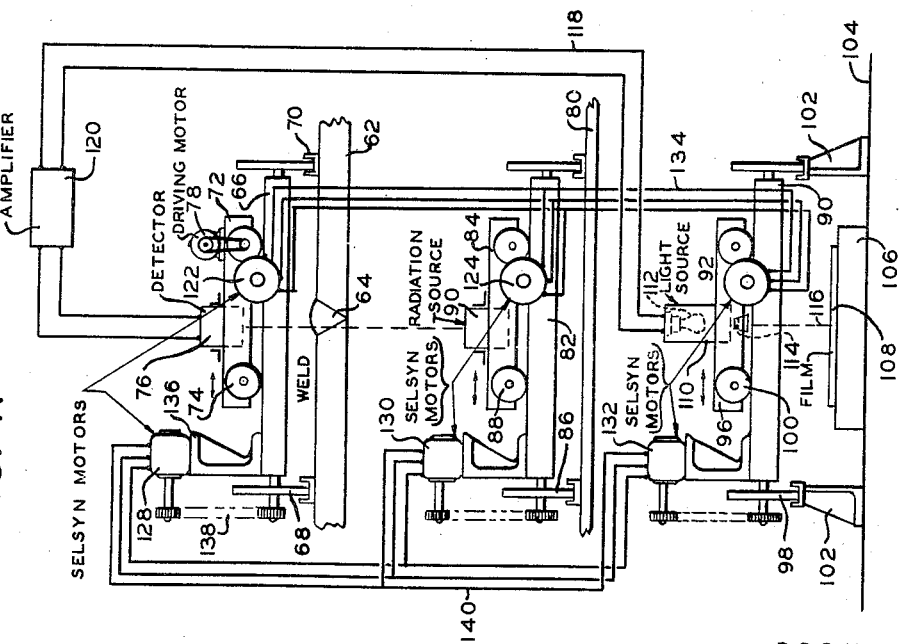

In Fig. 4 an embodiment of the invention is shown in which electrical means are utilized for synchronizing the movement of the radiation source, the detector and the recording device. This would be of use in instances where it would be impractical or impossible to use a support such as is shown at 20 in Fig. 1 and would have application in connection with examining large castings or plates such as the plates forming the wall or skin of a ship.

In Fig. 4 a steel plate 62 or, rather, a pair of plates joined by means of a butt weld 64 is shown together with apparatus for examining that section of the plate containing the weld. Although the object 62 to be examined has been described as a steel plate, it is believed obvious that the invention is also applicable to the examining of castings or, in fact, substantially any opaque article. A carriage 66 mounted on wheels 68 movable in a pair of tracks 70 resting on the upper surface of the plate 62 serves as a support for another carriage 72 mounted on wheels 74 travelling in grooves in the carriage 66. The carriages 66 and 72 correspond, respectively, to the carriages 36 and 30 of Fig. 1. The carriage 72 is adapted to move laterally of the weld 64 while the carriage 66 can move longitudinally with respect to the weld. The detector of radiation 76 corresponding to the detector 18 of Fig. 1 is supported by the carriage 72. A reversible driving motor 78 is mounted on the carriage 72 and means, not shown, are provided for reversing this motor as the carriage 72 reaches the ends of its stroke. This reversing means may be substantially the same as that indicated at 46 and 48 in Fig. 2. Means are also provided which may correspond to the pawl and ratchet elements 56 and 58 of Fig. 1 for moving the carriage 66 a slight amount longitudinally of the weld 64 each time the carriage 72 reaches the end of a stroke. In this manner the detector 76 may be moved laterally and longitudinally over the weld 64 and portions of the plate 62 adjacent to the weld in a manner so as to scan the section which it is desired to examine.

Underneath or at the other side of the plate 62 and mounted on a suitable support 80 is a device comprising carriages 82 and 84 mounted on wheels 86 and 88, respectively, for supporting a source of radiation 90. The mounting of the carriages 82 and 84 is substantially the same as for the carriages 66 and 72. Disposed at any convenient point is a recording device indicated generally at 92 and comprising a third pair of carriages 94 and 96 mounted, respectively, on wheels 98 and 100. A pair of tracks or supporting members 102 are mounted on any suitable base 104 in such a manner as to support the carriages 94 and 96 over a plate 106 on the upper surface of which is disposed a record sheet 108 which may be a photosensitive film. Supported by the carriage 96 is a light emitting device 110 shown as containing an electric lamp 112. The device 110 may contain a suitable lens 114 for directing a beam or pencil of light 116 onto the film 108.

It will be seen that if the three pairs of carriages containing the radiation source 90, the radiation detector 76 and the light emitting device 110 are moved in synchronism with the lamp 112 and connected electrically by wires 118 to an amplifier 120 which amplifier receives the output of the detector 76, the amount of light in the beam 116 will vary in accordance with the intensity of radiation which is transmitted from the source 90 through the plate 62 to the detector 76, and in this manner the film 108 will contain an image of the weld 64 and the adjacent portions of the plates 62. In order to provide for synchronous movement of these carriages, two series each containing three Selsyn motors 122, 124, 126 and 128, 130 and 132 are provided. The Selsyn motor 122 is mounted on the carriage 66 and has a connnection, such as a rack and pinion, not shown, with the carriage 72 so that as the carriage 72 is driven back and forth by means of the motor 78 the rotor of the Selsyn motor 122 will be rotated so that the two Selsyn motors 124 and 126 will move the carriage 84 and 96, respectively, at the same time and in the same direction as the carriage 72. The Selsyn motors 122, 124 and 126 are, of course, connected to each other electrically as by means of the wiring circuit 134. The operation of self-synchronous motors is well known and it is believed that no further description of these devices is necessary. Suffice it to say that when a plurality of these motors are connected together and movement is imparted to the rotor of one motor, the rotors will rotate simultaneously and in the same direction as the first mentioned rotor.

The Selsyn motor 128 is supported on a suitable bracket 136 from the carriage 66 and is connected by suitable pulleys and a belt 138 to one of the wheels 68. The motors 130 and 132 are mounted in a similar manner on the carriages 82 and 94, respectively, and are connected to the wheels 86 and 98 in a similar manner. The three Selsyn motors 128, 130 and 132 are interconnected electrically as by means of the wires 140. As the carriage 66 is moved longitudinally with respect to the weld 64, motion will be imparted through the belt 138 to the rotor of the motor 128 and simultaneous and similar rotation of the rotors of Selsyn motors 130 and 132 will cause the carriage 82 and 94 to move in synchronism with the carriage 66 and in the same relative direction.

It is believed that the operation of this embodiment of the invention has been made clear from the aforegoing discussion. By means of the two series of Selsyn motors lateral and longitudinal movement of the detector 76 will be imparted to the radiation source 90 and the light emitting device 110. Variations in the amount of radiation transmitted from the source 90 to the detector 76 which may be caused by the presence of irregularities such as blow holes in or adjacent the weld 64, will be amplified if necessary by means of the device 120 and will cause the amount of light emitted by the lamp 112 to vary simultaneously and in proportion to the variation in the radiation from the source 90. In this manner the film 98 will contain a record of the presence and location of any irregularities in the object being examined. It will be seen that in accordance with this embodiment of the invention the object 62 to be examined may be of almost any size since there is no mechanical connection between the source 90 and the detector 76. Furthermore, the recording apparatus 92 can be located at any desired place such as in a photographic dark-room which may be remote from the object 62.

As has been previously pointed out, it may in certain cases be found inconvenient to move both the source of radiation and the detector in synchronism, and in Fig. 5 another embodiment of the invention is disclosed in which a source of radiation 142 is shown in a stationary position beneath or at one side of a plate 144 containing a weld 146. The source 142 is preferably placed beneath the center of the weld or section of the plate or casting to be examined. Above or on the other side of the plate 144 is a device similar to that already described with reference to Fig. 4, this device including a radiation detector 146 supported by a carriage 148 laterally movable with respect to the weld 146 and which carriage is, in turn, mounted on another carriage 150. The carriage 150 is supported by wheels 152 adapted to run in tracks 154 in a direction longitudinally of the weld 146. A reversible motor 156 corresponding to the motor 78 of Fig. 4 and 42 of Figs. 1, 2, and 3 serves to drive the carriage 148 back and forth laterally of the weld 146 and a suitable pawl and ratchet mechanism, not shown, but which may be similar to the elements 52, 56 and 58 of Figs. 2 and 3 may be provided for moving the carriage 150 longitudinally with respect to the weld 146 a small increment each time the direction of movement of the carriage 148 is reversed.

A recording device 158 substantially the same as the device 92 of Fig. 4 is provided and includes a light source 160 supported by a carriage 162 mounted upon a carriage 164, the last mentioned carriage being supported by wheels 166 adapted to run in tracks 168 supported above a film or record sheet 170. A pair of Selsyn motors 172 and 174 are mounted, respectively, on the carriages 150 and 164 and are connected together electrically as at 176 so that movement of the carriage 148 back and forth across the weld 146 will cause movement of the carriage 162 the same amount and in the same direction over the record sheet 170. Another pair of Selsyn motors 178 and 180 are mounted, respectively, on the carriages 150 and 164 and are connected to the wheels 152 and 166. The Selsyn motors 178 and 180 are connected together electrically as at 182 so that longitudinal movement of the carriage 150 with respect to the weld 146 will cause similar longitudinal movement of the carriage 164 with respect to the film or record sheet 170. It will be seen that the synchronizing means of Fig. 5 is the same as that of Fig. 4 with the exception that no means is provided for moving the radiation source with respect to the detector and the light emitting source.

The output of the detector 147 may, if desired, be amplified as at 184 and connected to the electric lamp 186 in the light source 160 so that as the detector 147 is moved to scan the plate section containing the weld 146 the intensity of the beam of light 188 emitted from the source 160 will vary in accordance with variations in the amount of radiation from the source 142 transmitted to and received by the detector 147. When the carriage 148 is directly above or opposite the source 142, the amount of radiation reaching the detector will be greater than that when the detector is at any other position and the radiation picked up by the detector will vary in accordance with the position of the detector with relation to the source. Means are provided for compensating the lamp intensity for varying positions of the detector 147 with respect to the source 142, these means comprising a variable resistance 190 connected in the circuit 192 between the amplifier 184 and the lamp 186. A cam 194 on a rod 196 connected to the carriage 148 actuates a movable contact 198 along the resistance 190 as the carriage 148 is moved back and forth over the weld 146. When the detector 147 is at either end of its stroke and thus at the greatest distance from the source 142, none of the resistance 190 will be included in the circuit 192, but as the detector nears a point directly opposite and thus closest to the source 142, an increasing amount of the resistance 190 will be interposed in the circuit 192 and by selecting a suitable value for the resistances 190 the intensity of the light beam 188 can be maintained substantially constant as far as the position of the detector 147 with respect to the source 142 is concerned. It is understood that any other suitable compensating device may be utilized in place of the elements 190 and 194.

The operation of the embodiment of the invention shown in Fig. 5 is substantially the same as that already described with regard to Fig. 4. Movement of the detector 147 in scanning the weld 146 will cause corresponding synchronous movement of the light source 160 and as a result the film 170 will contain an image of the interior of the weld 146 and parts of the plate 144 adjacent thereto. Any irregularities or blow holes in the weld or plate will show up as light or dark areas on the film. As is the case with respect to the embodiment shown in Fig. 4, the recording apparatus 158 may be remote from the weld 146, it being merely necessary to connect the Selsyn motors 172 and 174 together electrically as well as the Selsyn motors 178 and 180.

Again it should be understood that while a weld between two steel plate sections has been shown and described as the object to be examined, substantially any opaque object can be examined in a similar manner. For instance, castings for large high pressure valves could be examined, it being merely necessary to mount rails or tracks such as 154 on suitable portions of the casting. In another manner a thin plate previously tested for uniformity of density and homogeneity could be used to support the detector and its carriages at one side of the object to be examined while the radiation source is placed at the other side either in fixed position as shown in Fig. 5 or synchronously movable with the detector as shown in Fig. 4. The radiation would then pass from the source through the object to be examined and the plate on which the detector apparatus moves to the detector itself.

Obviously many modifications and variations of the invention, as hereinbefore set forth, may be made without departing from the spirit and scope thereof and, therefore, only such limitations should be imposed as are indicated in the appended claims.

I claim:

1. The method of examining an opaque plate which comprises passing a beam of penetrating radiation into the plate from a source at one side thereof while moving said source back and forth and laterally along a predetermined section of the plate so as to scan said section, detecting the amount of radiation transmitted through said plate during said movement, energizing a radiation emitting device in accordance with variations in the amount of detected transmitted radiation, and moving said device over and in proximity to a radiation sensitive plate in synchronism with the said movement of said radiation source.

2. The method of examining an opaque plate which comprises passing a beam of penetrating radiation into the plate from a source at one side thereof while moving said source along said section in a series of parallel lines, each line of motion being displaced a slight amount from the preceding line, detecting the amount of radiation transmitted through said plate during said movement, energizing a light emitting device in accordance with variations in the amount of detected transmitted radiation, and moving said device over and in proximity to a light sensitive plate in synchronism with the said movement of said radiation source.

3. The method of examining an opaque plate which comprises directing a beam of penetrative radiation transversely through said plate from a source at one side thereof, detecting transmitted radiation at a point at the other side of the plate opposite said source, moving the source and the detecting means along the plate while maintaining said source and detecting means constantly opposite each other and the same distance apart, transmitting the output of the detecting means to a light emitting device, and moving said device over a light sensitive surface in synchronism with said source and detecting means, whereby a record will be obtained of the existence of irregularities in density of that portion of the plate traversed by the beam of radiation.

4. The method of recording an image of the interior of a section of an opaque plate which comprises directing penerative radiation into said plate from a source at one side of said section, detecting at the opposite side of said plate section radiation transmitted through the plate from said source, moving the detecting means back and forth and laterally along the plate section so as to scan said section, moving a light emitting device in synchronism with said detecting means over a light sensitive surface and energizing said light device in accordance with variations in the amount of transmitted radiation detected.

5. The method of recording an image of the interior of a section of an opaque plate which comprises directing penetrative radiation into said plate from a source at one side of said section, detecting at the opposite side of said plate section radiation transmitted through the plate, moving the detecting means back and forth and laterally along the plate section so as to scan said section, moving a light emitting device in synchronism with said detecting means over a light sensitive surface, energizing said light device in accordance with variations in the amount of transmitted radiation detected, and varying the energization of said light device to compensate for variations in distance between the source and the detecting means.

6. The method of preparing a picture showing the position and thickness of irregularities in the interior of an opaque object which comprises directing a beam of penetrative radiation from a source into and through said object from one side thereof, the intensity of radiation transmitted through the object to the opposite side depending upon the density of the material in the path of the radiation, detecting at said opposite side radiation transmitted through the object, moving said source and the detecting means in synchronism over two opposite surfaces of the object, moving a marking device also in synchronism with said source over a record sheet, and actuating said marking device in accordance with variations in the intensity of detected transmitted radiation, said variations in intensity corresponding to the thickness and density of an irregularity in said object so that an image of the interior of the object is recorded on said sheet.

7. The method of preparing a picture showing irregularities in the interior of an opaque object which comprises directing a beam of penetrative radiation from a source into and through said object from one side thereof, the amount of radiation transmitted through the object to the opposite side depending upon the amount of material in the path of the radiation, detecting at said opposite side radiation transmitted through the plate, moving said source and the detecting means in synchronism longitudinally and laterally over said object, moving a beam of light also in synchronism with said source over a light sensitive sheet, and actuating said light in accordance with variations in the amount of detected transmitted radiation whereby an image showing gradations in the density of said object is recorded on said sheet.

8. An apparatus for recording an image of the interior of a section of an opaque object such as a plate or casting which comprises a source of penetrative radiation disposed at one side of said object, a detector of radiation disposed opposite said source at the other side of the object, an arm supporting said source and said detector, a light source also supported by said arm, means for moving said arm longitudinally and laterally along said section, electrical connections between the detector and light source so that the light emitted from the light source will vary in intensity in accordance with the amount of detected transmitted radiation, and a light-sensitive plate mounted in the path of the light from said light source.

9. An apparatus for recording an image of irregularities in a welded joint in a metal plate comprising a source of penetrative radiation disposed at one side of said plate opposite the welded joint, a detector of radiation disposed at the other side of said plate opposite said source, a light emitting device connected to said detector so that the amount of light emitted will vary in intensity in accordance with the amount of detected radiation transmitted through said plate and welded joint, a light sensitive plate mounted in the path of light emitted by said device, a supporting frame for said source, detector and light emitting device, a carriage attached to said frame and mounted on one side of said plate over said welded joint, and means for moving said carriage longitudinally and laterally over said joint.

10. An apparatus for recording an image of irregularities in a welded joint in a metal plate comprising a source of penetrative radiation disposed at one side of said plate opposite the welded joint, a detector of radiation disposed at the other side of said plate opposite said source, a light emitting device connected to said detector so that the amount of light emitted will vary in accordance with the amount of detected radiation transmitted through said plate and welded joint, a light sensitive plate mounted in the path of light emitted by said device, a carriage supporting said radiation source and adapted to be moved longitudinally and laterally along said welded joint, means for driving said carriage, a second carriage supporting said detector and adapted to be moved longitudinally and laterally along said welded joint, a third carriage supporting said light emitting device and adapted to be moved longitudinally and laterally along said light sensitive plate, means for moving the first two mentioned carriages in synchronism longitudinally and laterally over said welded joint and means for moving said third carriage over said light sensitive plate in synchronism with said first and second carriages.

11. An apparatus for recording an image of irregularities in a welded joint in a metal plate comprising a source of penetrative radiation disposed at one side of said plate opposite the welded joint, a detector of radiation disposed at the other side of said plate opposite said source, a light emitting device connected to said detector so that the amount of light emitted will vary in accordance with the amount of detected radiation transmitted through said plate and welded joint, a light sensitive plate mounted in the path of light emitted by said device, a carriage supporting said radiation source and adapted to be moved longitudinally and laterally along said welded joint, means for driving said carriage, a second carriage supporting said detector and adapted to be moved longitudinally and laterally along said welded joint, a third carriage supporting said light emitting device and adapted to be moved longitudinally and laterally along said light sensitive plate and means for moving said second and third carriages longitudinally and laterally in synchronism with said first carriage when said first carriage is moved by said driving means.

12. An apparatus for recording an image of irregularities in a welded joint in a metal plate comprising a source of penetrative radiation disposed at one side of said plate opposite the welded joint, a detector of radiation disposed at the other side of said plate opposite said source, a light emitting device connected to said detector so that the amount of light emitted will vary in accordance with the amount of detected radiation transmitted through said plate and welded joint, a light sensitive plate mounted in the path of light emitted by said device, a carriage supporting said radiation source and adapted to be moved longitudinally and laterally along said welded joint, means for driving said carriage, a second carriage supporting said detector and adapted to be moved longitudinally and laterally along said welded joint, a third carriage supporting said light emitting device and adapted to be moved longitudinally and laterally along said light sensitive plate, a series of three Selsyn motors, one connected to each of said carriages for moving said carriages longitudinally in synchronism and a second series of three Selsyn motors one connected to each of said carriages for moving said carriages laterally in synchronism.

DONALD G. C. HARE.